United States Patent

Schegerin

[11] Patent Number: 5,662,137
[45] Date of Patent: Sep. 2, 1997

[54] OPTIMAL PNEUMATIC PRESSURE REGULATOR WITH ELECTRONIC COMPENSATION

[76] Inventor: Robert Schegerin, 4 Chemin Du Vallot, 78350 Jouy En Josas, Paris, France

[21] Appl. No.: 420,408

[22] Filed: Apr. 12, 1995

[30] Foreign Application Priority Data

Apr. 18, 1994 [FR] France ................... 94 04591

[51] Int. Cl.⁶ .................................................. G05D 16/20
[52] U.S. Cl. .................. 137/487.5; 137/495; 137/505.14
[58] Field of Search ..................... 137/487.5, 495, 137/484.2, 505.14

[56] References Cited

U.S. PATENT DOCUMENTS

| | | | |
|---|---|---|---|
| 2,219,441 | 10/1940 | Carnes. | |
| 3,534,770 | 10/1970 | Kowalski | 137/509 |
| 3,811,465 | 5/1974 | Abbey | 137/487.5 |
| 3,860,029 | 1/1975 | Hubler | 137/487.5 |
| 4,203,465 | 5/1980 | Rissi | 137/487.5 |
| 4,287,909 | 9/1981 | Tompson et al. | 137/505.14 |
| 4,394,871 | 7/1983 | Czajka et al. | 137/487.5 X |
| 4,768,548 | 9/1988 | Maurer | 137/487.5 |
| 4,773,443 | 9/1988 | Maurer | 137/487.5 |
| 4,893,646 | 1/1990 | Wimmer | 137/487.5 |
| 5,152,309 | 10/1992 | Twerdochlib et al. | 137/487.5 X |
| 5,425,270 | 6/1995 | McDonald | 137/487.5 X |

FOREIGN PATENT DOCUMENTS

| | | |
|---|---|---|
| 0 048 440 | 3/1982 | European Pat. Off. . |
| 2 609 519 | 7/1988 | France. |
| 12 73 457 | 7/1968 | Germany. |
| 2 165 372 | 4/1986 | United Kingdom. |

*Primary Examiner*—Stephen M. Hepperle
*Attorney, Agent, or Firm*—Jaeckle Fleischmann & Mugel, LLP

[57] ABSTRACT

A pneumatic pressure regulator comprised of at least an obturator actuated by at least an elastic membrane comprised of at least an inlet orifice which permits the entry of a fluid under pressure and comprises at least an outlet orifice which permits the exit of a fluid under regulated pressure, characterized by a programmable means (6) which creates a force F on the obturator (2), this force F being defined at the end of a test by varying the value of at least a parameter P of the functioning of the regulator in such a manner that the outer pressure $PS=f(P)$ of the regulator is exactly equal to the value of the predefined pressure $PD=f(P)$ for each value of the parameter P of the operation of the regulator.

13 Claims, 2 Drawing Sheets

OPTIMAL PNEUMATIC PRESSURE REGULATOR WITH ELECTRONIC COMPENSATION

BACKGROUND OF THE INVENTION

The invention presented herein relates to the regulation of fluid in a particularly reliable and precise fashion.

Pressure regulation devices have been known for a long time. The majority of pressure regulation devices are pneumatic and electronic. A number of patents relating to pressure regulation devices exist, including regulators that release pressure in beer barrels dating from the previous century. These pneumatic pressure regulation devices are reliable because they utilize proven technologies and do not require an electrical energy source for their operation. Their precision is limited and their rigging is difficult and expensive.

Electronic pressure regulation devices are equally well known; they are comprised of, at minimum, a pressure sensor and an actuator which opens or closes as a function of the command signal issued by the pressure sensor. These electronic regulation systems are not reliable because they require an electrical source which can fail. On the other hand, precision electronic systems are very expensive. These systems are sensitive to exterior conditions such as temperature and must be compensated, which increases their complexity.

The present invention aims notably to furnish a regulation system which responds much better than those previously known in practice, most notably, it permits the regulation of a fluid in a precise and reliable manner and for a reasonable cost.

SUMMARY OF THE INVENTION

This invention proposes notably an electronically compensated pneumatic regulator with a programmable correction system, on the one hand, after testing, all the imprecisions due to fabrication tolerances of pneumatic regulators, and on the other hand, to modify the regulated outlet pressure in order to obtain in a precise fashion the outlet regulation law that may be precise, complex and nonlinear, then the electronic compensation systems can be non-precise and consequently less costly in the measure where the compensation force F is reliable. For example, if the force F represents just 10% of the force in play of the equilibrium of the obturator, then an error of 5%, for example, of the force F will drive an error of $E=0.10 \times 0.05 = 0.005$ or 0.5% only on the accuracy of the outlet pressure. The other errors attributed to pneumatic regulation are naturally corrected by a programmable method. The following terms are employed in the overall sense and have principally the following significance:

Pneumatic pressure regulator: a system that regulates the pressure of a fluid whether it is liquid or gaseous.

SE: Pressure sensing area. This area forms a boundary between the volume VS where the pressure is to be regulated and the volume VR where the pressure is the reference pressure.

PE: Regulator inlet pressure

PS: Regulator outlet pressure

PR: Reference pressure

One goal of this invention is to propose a pneumatic pressure regulator comprised of at least an obturator actuated by at least an elastic membrane with a pressure sensing area SE which forms a boundary between the volume VS where the pressure is regulated and the volume VR where the pressure is the reference pressure, this regulator is comprised of at least an inlet orifice which permits entry of a fluid under pressure and comprised of at least an outlet orifice which permits the exit of the fluid at the regulated pressure.

These goals are achieved by a system according to this invention which is essentially characterized by a programmable means which creates a force F on an obturator, this force F, being defined at the end of a test and varying as a function of at least one parameter P relating to the operation of the operation of the regulator in a manner that the outlet pressure $PS=f(P)$ of the regulator is exactly equal to the value of the predefined pressure $PD=f(P)$ for each value of the parameter P measured during operation of the regulator.

According to one advantageous embodiment, the command parameter P is the pressure PE of the fluid at the regulator inlet, this pressure being measured by a pressure sensor, the information furnished by this command pressure sensor is sent to a programmable controller which commands a means to create a force on the obturator, and is programmed in the course of a preliminary test of the regulator in order that the value of the force F applied to the obturator is such that the outlet pressure $PS=f(PE)$ is equal to the value of the desired pressure $PD=f(PE)$ whatever the value of the pressure PE.

According to another advantageous embodiment, the command parameter P is the flow D of the fluid flowing through the regulator, this flow D is measured by a flow sensor, the information supplied by the flow command sensor is sent to a programmable controller which commands a means to create a force on the obturator, and is programmed in the course of a preliminary test of the regulator in order that the value of the force F applied to the obturator is such that the outlet pressure $PS=f(D)$ is equal to the value of the outlet pressure desired $PD=f(D)$ whatever the value of the flow D.

According to another advantageous embodiment, the command parameter P is the value of the reference pressure PR, this value PR being measured by a pressure sensor, the information of this command sensor is sent to a programmable controller which commands the means to create a force on the obturator, and is programmed in the course of a preliminary test of the regulator in order that the value of the force F applied to the obturator is such that the outlet pressure $PS=f(PR)$ is equal to the value of the desired outlet pressure $PD=f(PR)$ whatever the value of the reference pressure PR.

According to another advantageous embodiment, the average command creating a force on the obturator is a pneumatic chamber containing a fluid under pressure PV and having an effective sensing area such that $F=PV \times SE$.

According to another advantageous embodiment, the average command creates a force F which is relatively small such that the regulator performance is still acceptable even though there is a failure of the programmable electronic systems.

This invention is better understood in view of the detailed description which follows in conjunction with a preferred embodiment illustrated in the attached drawings.

DETAILED DESCRIPTION OF THE PREFERRED EMBODIMENT

Figure 1:
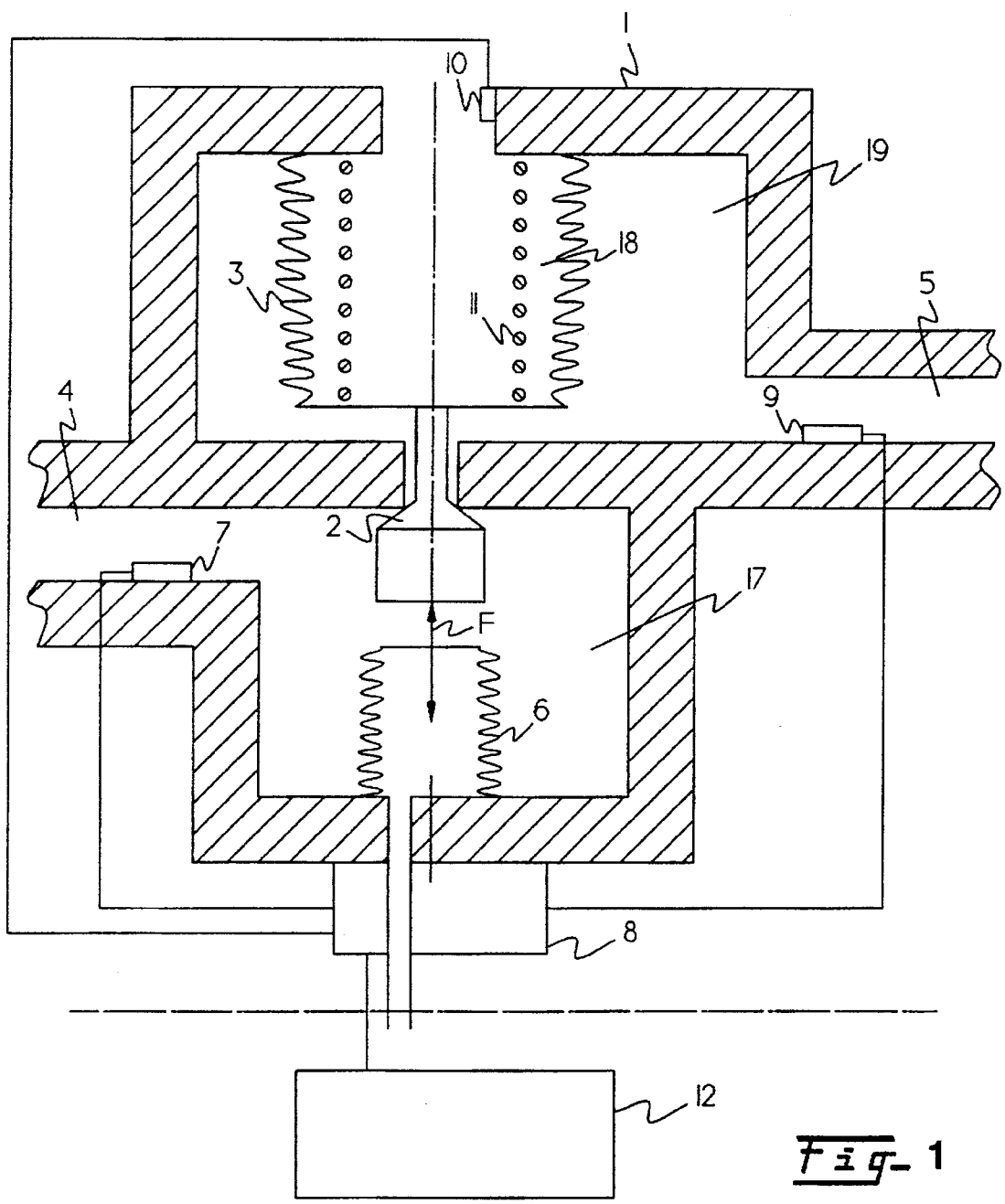
FIG. 1 illustrates a pneumatic regulator 1 which is comprised of an obturator 2 and an elastic membrane 3.

The detailed description that follows refers to a preferred embodiment, as shown in FIG. 1. The embodiment is comprised of an electronic correction based on a parameter P which has been chosen here to be equal to the value of the reference pressure PR. The reader should understand that the invention applies equally if one identifies the parameter P at a value of flow D or the value of the inlet pressure PE for example. The invention applies equally of one identifies the parameter as a combination of values of several operational parameters of the regulator. In this case, the controller integrates the different factors to define the force F to apply to the obturator, and F will then be a function of the different parameters.

A pneumatic regulator regulates the outlet pressure of a fluid that flows through it. This regulated pressure varies as a function of a number of parameters such as temperature, flow, inlet pressure, reference pressure, etc. An example of such a regulator is presented in FIG. 1. Shown in FIG. 1, pneumatic regulator 1 is comprised of obturator 2 and elastic membrane 3. This membrane separates the fluid under regulated pressure occupying the volume VS in regulation chamber from the fluid at reference pressure occupying the volume VR in reference chamber 18. Spring 11 holds the obturator to open or close and permits regulation of an equilibrium value. Obturator 2 separates the volumes VS and VE, the VE being the volume in inlet chamber 17 where the fluid under pressure is introduced. The fluid under pressure enters at the inlet 4 exits at a regulated pressure at the outlet 5. A pressure sensor 7 is located within inlet 4. A pressure sensor 10 is located in reference chamber 18 containing volume VR. A flow meter 9 is located at the outlet 5, for example, and measures the flow through regulator 1. The measurements by sensor 7, 9 and 10 are sent to controller 8 which makes up part of the regulator. A means 6 creates a force F applied to the obturator 2 which permits a correction to the operation of the regulator to obtain the desired regulated pressure with great precision as the function of the parameters measured by the sensor 7, 9 and 10. Bench and controller 12, which is not an integral part of the regulator, measures the performance of the regulator over the entire operating range of the regulator, sweeps the parameters and compares the desired performance with the measured performance and deducts the corrections supplied and consequently the force F to be applied to the obturator 2. In a preferred embodiment, the regulator contains springs and adjustments which were not fabricated with precise tolerances and therefore with a reduced fabrication cost. In this case, the regulator contains a pressure sensor 10 which measures the reference pressure. The information supplied by this pressure sensor is sent to the controller 8. A test is performed on this regulator with the aid of the control bank 12. The regulated pressure PR by the regulator is precisely measured by the control bank such that the reference pressure supplied by the control bank varies. For example, ten measurements are performed for ten values of the stabilized reference pressure.

The value corresponding to the regulated pressure is recorded. Taking into account the characteristics of the regulator, the controller 8 deducts the corresponding values of the force F to be applied for each value of the reference pressure parameter. This collection of points can be smoothed by the controller to obtain a continuous curve representing a continuous function defining the value of F for each value of the reference pressure PR measured by the pressure sensor 10. This operation can be restarted many times to augment the precision of the system. The force F is produced by a low power actuator 6 which reacts to the commands issued by the controller according to the following relationship:

$$F = f(PSD - PSR)$$

where PSD is the desired regulation pressure and PSR is the regulated pressure measured at the time of the preliminary tests.

The force F is small such that in case of a failure of the electronic systems, the regulation values are close to the desired ones. Here the actuator is comprised of a piston moved by the fluid pressure. A simple electronic regulation system that is low in cost and not very accurate is utilized to regulate the pressure supplied to the actuator. In order to be able to utilize standard, low cost components, the force F never exceeds one fifth of the force exerted by spring 11. In other words, $F < R/5$ where R is the force exerted by spring 11.

Figure 2:
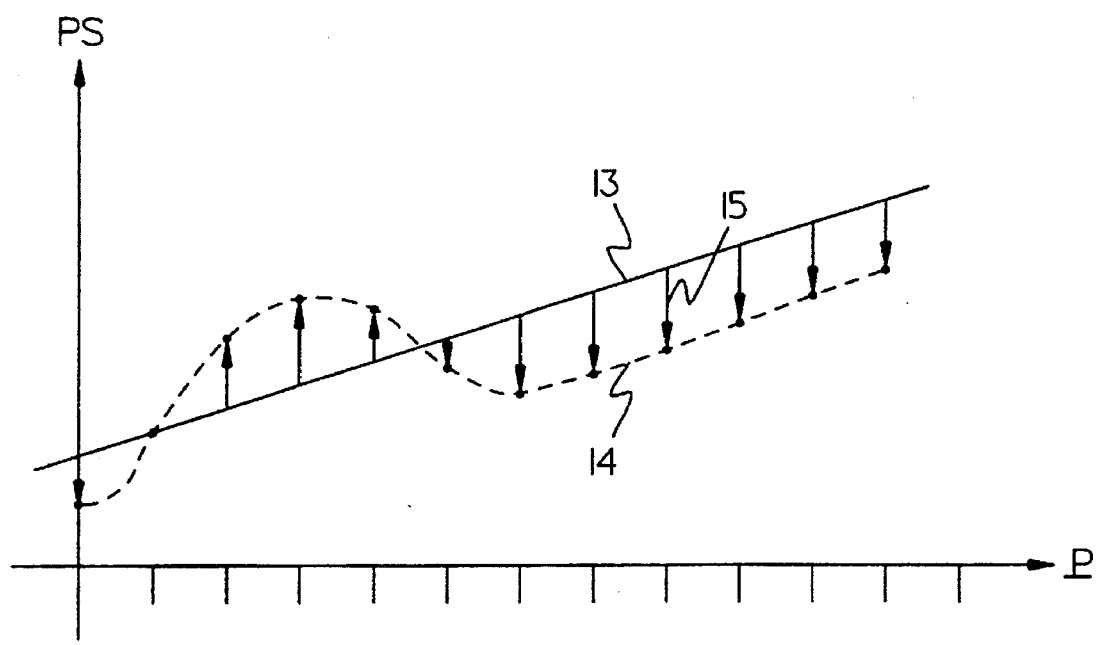
FIG. 2 is a graph which illustrates the value of the parameter P on the abscissa and the value of the regulated pressure at the regulator outlet PS on the ordinate.

FIG. 2 is a graph illustrating the value of the parameter P on the abscissa and the value of the regulated pressure at the regulator outlet PS on the ordinate. The curve 13 represents the development of the value of the outlet pressure without electronic correction PSR as the parameter P varies. Curve 14 represents the development of the desired value of the outlet pressure PSD. The algebraic difference between the curves 14 and 13 is equal to the correction C as follows: C=PSD−PSR (arrows 15).

Figure 3:
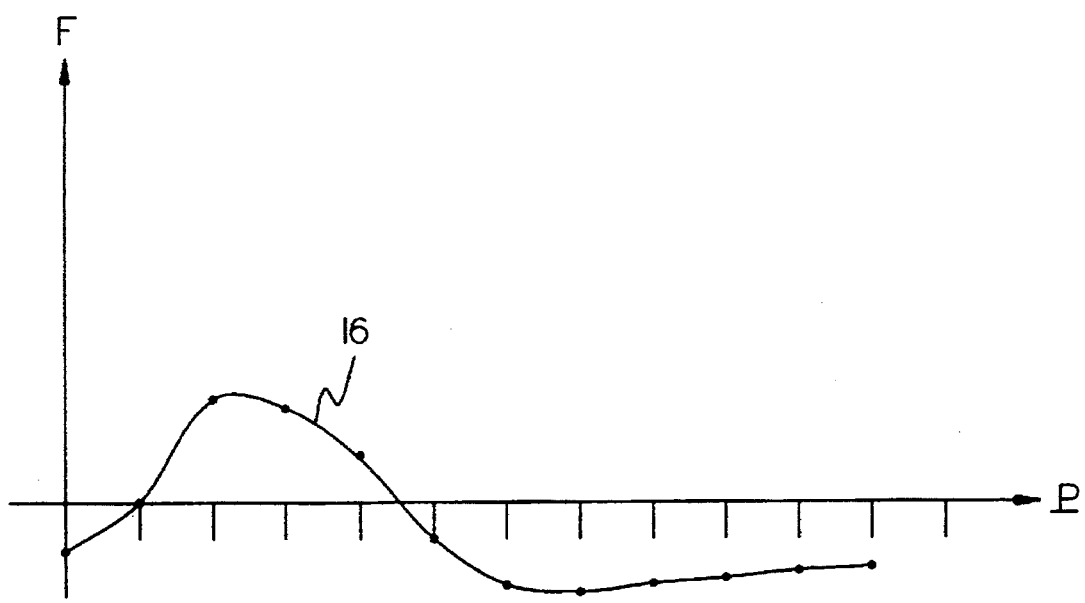
FIG. 3 is a graph illustrating the value of the parameter P on the abscissa and the force F on the ordinate.

FIG. 3 is a graph illustrating the value of the parameter P on the abscissa and the force F on the ordinate. The curve 16 presents the algebraic development of the force F applied to the obturator to correct the operation of the regulator in such a manner that the value of the pressure correction is equal to C.

The applications of this invention are numerous. The invention has applications in the regulation of fluids, either liquid or gaseous, where the required regulation precision is very high and where safety criteria are very important and where it is necessary to conceive a product at reduced cost.

What is claimed is:

1. A pneumatic pressure regulator comprising:

an inlet orifice;

an inlet chamber in communication with said inlet orifice;

an outlet orifice which permits exit of fluid under a regulated pressure, PS;

a regulation chamber in communication with said outlet orifice;

a reference chamber defined by an elastic membrane having a sensing area SE which forms a boundary between said regulation chamber and said reference chamber;

an obturator operatively arranged to control flow and regulate pressure of gas flowing from said inlet chamber to said regulation chamber via a passageway therethrough, said obturator actuated by said elastic membrane;

a programmable controller; and, means responsive to said programmable controller for applying a force F to said obturator, said force F being determined as a result of a test of said regulator, said force varying as a function of a parameter P such that said outlet pressure PS=f(P) is exactly equal to a predefined pressure PD=f(P) for each and every value of parameter P.

2. A regulator as recited in claim 1 wherein said parameter P is a pressure PE of fluid within said inlet chamber.

3. A regulator as recited in claim 2 further comprising a pressure sensor to measure pressure of fluid in said inlet chamber, said pressure sensor operatively arranged to transmit said pressure measurement to said programmable controller, said programmable controller, which is programmed during a preliminary test of said regulator, operatively arranged to command a means to produce a force on said obturator such that said outlet pressure PS=f(PE) is equal to said predefined pressure PD=f(PE) for each and every value of pressure PE.

4. A regulator as recited in claim 1 wherein said parameter P is a flow D of fluid flowing through said regulator.

5. A regulator as recited in claim 4 further comprising a flow meter located within said regulator and operatively arranged to measure the flow of fluid therethrough and to transmit said flow measurement to said programmable controller, said programmable controller, which is programmed during a preliminary test of said regulator, operatively arranged to command a means to produce a force on said obturator such that said outlet pressure PS=f(D) is equal to said predefined pressure PD=f(D) for each and every value of flow D.

6. A regulator as recited in claim 1 wherein said parameter P is a pressure PR within said reference chamber.

7. A regulator as recited in claim 6 further comprising a pressure sensor to measure pressure of fluid in said reference chamber, said pressure sensor operatively arranged to transmit said pressure measurement to said programmable controller, said programmable controller, which is programmed during a preliminary test of said regulator, operatively arranged to command a means to produce a force on said obturator such that said outlet pressure PS=f(PR) is equal to said predefined pressure PD=f(PR) for each and every value of pressure PR.

8. A regulator as recited in claim 7 wherein said means for producing a force F on the obturator comprises a pneumatic chamber containing a fluid under variable pressure PV having a sensing area SE such that F=PV×SE.

9. A regulator as recited in claim 8 further comprising a spring within said pneumatic chamber which produces a force R which tends to hold the obturator at equilibrium in either an open or closed position.

10. A regulator as recited in claim 9 wherein said means for producing a force F comprises a piston moved by fluid pressure.

11. A regulator as retired in claim 10 wherein said force F is controlled to never exceed one-fifth of force R.

12. A regulator as recited in claim 1 wherein said parameter P is a combination of measured parameters.

13. A regulator as recited in claim 12 wherein said parameter P comprises pressure PE within said inlet chamber, flow D of fluid flowing through said regulator, and pressure PR within said reference chamber.

* * * * *